Dec. 30, 1930.  A. H. MARTY  1,787,386
MOUNTING FOR GLASS WINDOWS OR THE LIKE
Filed April 27, 1929   3 Sheets-Sheet 1
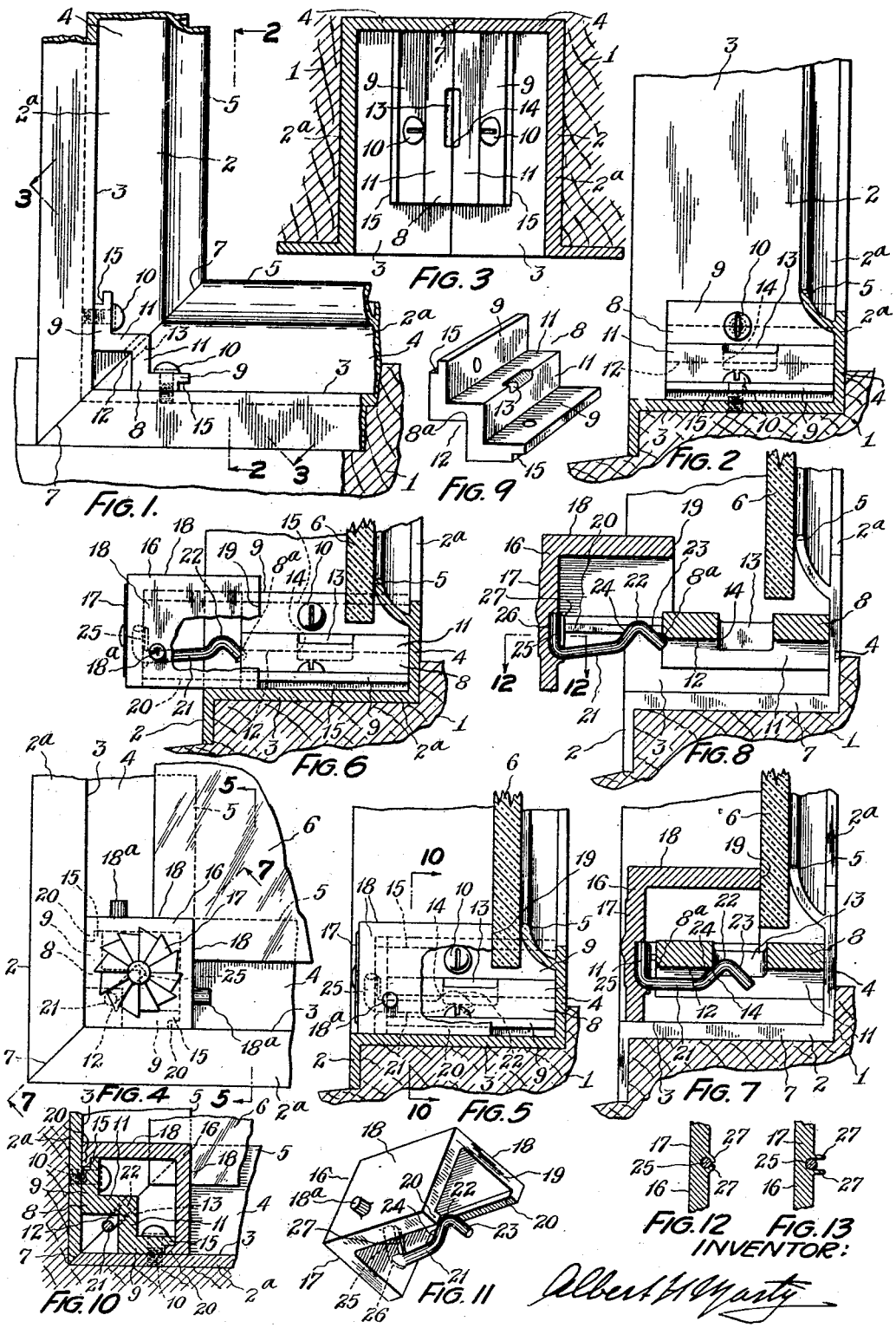
INVENTOR:
Albert H. Marty Dec. 30, 1930.  A. H. MARTY  1,787,386
MOUNTING FOR GLASS WINDOWS OR THE LIKE
Filed April 27, 1929  3 Sheets-Sheet 2

INVENTOR:
Albert H. Marty

Dec. 30, 1930. A. H. MARTY 1,787,386
MOUNTING FOR GLASS WINDOWS OR THE LIKE
Filed April 27, 1929   3 Sheets-Sheet 3
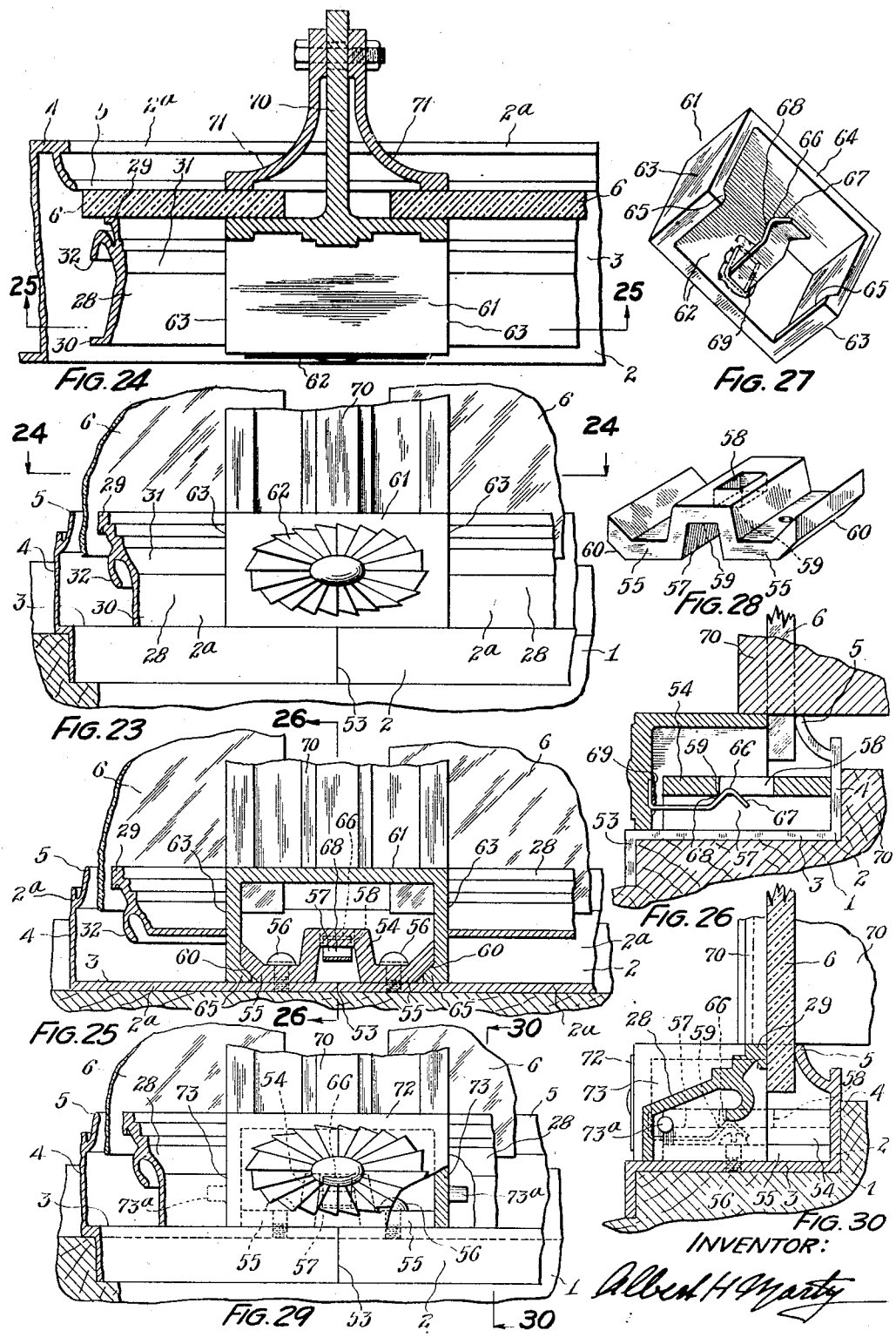
INVENTOR:
Albert H Marty Patented Dec. 30, 1930

1,787,386

UNITED STATES PATENT OFFICE

ALBERT H. MARTY, OF CLEVELAND, OHIO

MOUNTING FOR GLASS WINDOWS OR THE LIKE

Application filed April 27, 1929. Serial No. 358,594.

This invention relates to mountings for windows, such as are used in the construction of store fronts, display windows, show-cases, glass doors, transoms, partitions, sash, etc., and the specific disclosure of this invention shows and describes its application to a store front construction.

As is well known to those skilled in this art, store front and display windows are usually mounted in and supported on a stationary frame, and the glass is held in place by a removable clamping member or by a plurality of such members, so as to permit the installation of and the renewal of the glass. This stationary frame and clamping member may be made of any desired materials, metal being preferred.

More specifically this invention relates to an improved form of bracket for rigidly connecting together the component parts of the stationary frame and to an improved form of the clamping member for holding the glass in place and for co-operating with this improved bracket.

One object of this invention, accordingly, is to produce an improved form of bracket for holding the component parts of the supporting frame rigidly together and in perfect alinement.

Another object of this invention is to provide such a connecting bracket which will, at the same time, serve as a guide for an auxiliary clamping member, and which will also include means for co-operating with the member to hold it in position.

Another object of this invention is to produce an auxiliary clamping block, of artistic design, which is adapted to slide upon this improved bracket and to interlock with it.

Another object of this invention is to provide such an auxiliary clamping member which will resiliently contact the glass.

Another object of this invention is to produce such a clamping member which can be easily mounted in place without the use of tools.

Another object of this invention is to produce such an auxiliary clamping member which will automatically be held in place when pushed to its approximate position against the glass.

Another object of this invention is to produce a block which will be held resiliently but firmly against the frame for supporting the glass.

Another object of this invention it to so interlock the block with the bracket that the block cannot be disengaged from the bracket except in a direction at right angles with the plane of the glass.

Another object of this invention is to produce an auxiliary clamping block which is readily installed and removed before the main clamping members are in place, but which is provided with positive means to prevent its removal after the main clamping members are in place.

Another object of this invention is to produce an improved clamping mechanism for a window in which the main clamping members consist of relatively long bars separated by relatively short members against which the ends of the main clamping members abut.

Another object of this invention is to produce a clamping mechanism for a window in which the corner mitre is eliminated, and in which the corner is filled by means of an ornamental block resiliently mounted independently of the adjacent clamping members.

Another object of this invention is to produce mounting and clamping devices for a window which will facilitate the fabrication and expedite the erection of these members.

Further objects and advantages of this invention will appear in the following description and upon reference to the accompanying drawings.

The annexed drawings and the following description set forth in detail certain means embodying this invention, such disclosed means constituting, however, but a few of the forms in which the principle of my invention may be applied.

In said annexed drawings:

Figure 1 is a fragmentary front elevation of a joint in the frame or sill upon which this improved window mounting is supported and in which a bracket, forming an important feature of this invention, is shown connecting the two elements of the supporting frame, the particular joint illustrated being a right angle corner joint.

Figure 2 is a vertical section taken from the plane indicated by line 2, 2 in Figure 1.

Figure 3 is a section taken from the plane indicated by line 3, 3 in Figure 1, looking diagonally down upon the bracket.

Figure 4 is a view similar to Figure 1, but showing the glass mounted in the supporting frame, and also showing an auxiliary clamping member, constituting a second important feature of this invention, associated with the connecting bracket.

Figure 5 is a vertical section taken from the plane indicated by line 5, 5 in Figure 4 having a portion of the auxiliary clamping member partly broken away so as to more clearly show the engagement of this clamping member with the connecting bracket.

Figure 6 is a view similar to Figure 5, but showing the auxiliary clamping member in the position which it occupies at the commencement of its assembling with the bracket.

Figure 7 is a view taken from the plane indicated by line 7, 7 in Figure 4 accurately showing the interengagement of the auxiliary clamping member with the connecting bracket.

Figure 8 is a view similar to Figure 7, but showing the parts at the beginning of the assembling of the auxiliary clamping member with the connecting bracket, the position of the parts corresponding in this respect with Figure 6.

Figure 9 is a detached perspective view of the connecting bracket.

Figure 10 is a vertical cross-section taken from the plane indicated by line 10, 10 in Figure 5.

Figure 11 is a detached perspective view of the auxiliary clamping member.

Figure 12 is a fragmentary plan section taken from the plane indicated by line 12, 12 in Figure 8, and illustrating one method of connecting the two elements comprising the auxiliary clamping member.

Figure 13 is a view similar to Figure 12, but showing the position of certain elements before their final assembly.

Figure 23 is a view similar to Figure 14, showing this invention applied to a joint of the supporting frame in which the adjacent ends of the elements of the supporting frame do not meet at an angle but continue in the same line.

Figure 24 is a plan sectional view taken from the plane indicated by line 24, 24 in Figure 23.

Figure 25 is a vertical, longitudinal section taken from the plane indicated by line 25, 25 in Figure 24.

Figure 26 is a vertical, transverse section taken from the plane indicated by line 26, 26 in Figure 25.

Figure 27 is a detached perspective view of the modified form of auxiliary clamping member illustrated in Figures 23 to 26 inclusive.

Figure 28 is a detached perspective view of the connecting bracket used in the construction illustrated in Figures 23 to 26 inclusive.

Figure 29 is a front elevation similar to Figure 23, but showing an additional feature associated with one of the elements of this structure, and the omission of another feature.

Figure 30 is a vertical section taken from the plane indicated by line 30, 30 in Figure 29.

Figure 19:
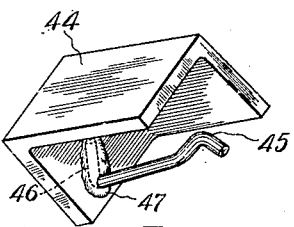
Figure 19 is another view similar to Figure 11, but showing a modified form of one of the elements comprising this auxiliary clamping member and also showing a modified method of connecting the two elements comprising this member.

I shall first describe the form of the invention illustrated in Figures 1 to 16 inclusive wherein my invention is applied in a mounting for a plate glass in store front construction. While, as illustrated, this invention is shown applied to the lower left corner of the window, it will be understood that the same or similar construction may be used for any other corner of the window, and that the adjacent supporting members of the building may be either sill, vertical frame or lintel.

In these figures 1 indicates the sill or supporting wall of the building upon which the window is to be mounted and 2 represents the frame which is supported on this sill or wall and is attached thereto by screws, anchor bolts or any other desired means. This frame preferably entirely surrounds the glass and serves as a means for supporting the glass as well as the various attachments to be hereinafter described. This frame is preferably constructed of a plurality of straight sections 2a suitably connected at their abutting ends. The frame is formed with a base portion 3 which is substantially perpendicular to the plane of the glass 6 and with a vertical wall 4 and a lip 5 adapted for contacting the inner side of the pane of glass. The sections 2a of the frame are preferably mitered or suitably beveled at their abutting ends as shown at 7. Brackets 8 are provided for rigidly connecting the abutting ends of these frame sections, these brackets being provided with ears 9 which are each parallel to the base 3 of one of the frame sections to be connected and are perforated to receive screws 10 which have threaded engagement with tapped holes in the frame, as clearly shown in Figures 1 to 3 inclusive. The brackets 8 closely contact the vertical walls 4 of the two abutting frame sections 2a so as to aline them with each other accurately. It will thus be seen that these brackets will accurately and firmly connect the abutting ends of the frame sections.

For the purpose of simplifying this description, the terms "inner", "outer", "upward", and "downward" will occasionally be used hereinafter. When so used "inner" will refer to that side of the supporting frame which is usually located on the inside of the window, namely, that side provided with the lip 5. "Outer" will, of course, refer to the opposite side. "Downward" will indicate a direction toward the frame 2, while "upward" will refer to the opposite direction, namely, toward the glass. It is understood, however, that these designations are not to be limiting, as the usual inner side may actually be placed on the outside of the enclosure, and the frame 2 is also placed in the vertical and inverted position as well as in the horizontal position illustrated in the drawings.

The ears 9 of the brackets 8 are each preferably formed with an angular bend 11 forming a groove or channel 12 therebetween. These brackets are further provided with a slot or recess 13 forming a shoulder or abutment 14 at the outer end of this recess, as best shown in Figures 8 and 9. The ears 9 of this bracket 8 are further formed with rabbeted edges as shown at 15 for a purpose to be hereinafter pointed out.

The hollow block-like filler member 16 which I shall name, auxiliary clamping member, is clearly shown in detached perspective view in Figure 11 and is shown in assembled or partially assembled position in Figures 4, 5, 6, 7, 8 and 10. This auxiliary clamping member is provided with a front face 17, which may have an ornamental design, a plurality of side walls 18, two as shown in the form illustrated in Figures 4 to 10, and a rear face 19 which is preferably partly open. In the form illustrated the side walls terminate in lips 20, which are suitably spaced and formed to slidably engage the rabbeted edges 15 of the ears 9 on the bracket 8. This auxiliary clamping member 16 is further provided with a resilient member 21 formed with a detent 22. This detent is formed with downwardly and inwardly inclined surface 23 at its extreme end, followed by a downwardly and outwardly inclined surface 24. This resilient member is further formed with a tail 25 which is suitably anchored in the front wall 17 of the member 16. This anchoring may be effected by any suitable method, but is preferably done by providing a recess 26 in the front wall for the tail 25 and by providing lips 27 adjacent to this recess, which are adapted to be bent over the tail 25, thus securely holding this tail in position in the auxiliary clamping member 16.

This auxiliary clamping member is adapted for interengagement with the bracket 8. This engaging of the auxiliary clamping member with bracket 8 is preferably effected after the glass 6 has been properly supported upon wood blocks or other suitable supporting means, and has been placed against the lip 5 of the frame 2. This auxiliary clamping member 16 is very easily engaged with the bracket 8. It is only necessary to rest the base of this clamping member against the frame 2, being sure to place the lips 20 in engagement with the rabbeted edges 15 on the bracket 8, and then slide the member, by hand, toward the glass until the high point of the detent 22 passes the abutment 14, whereupon the block automatically moves itself toward the glass until it contacts the glass.

The operation of the resilient detent 22 during this procedure will be clear from inspection of Figures 7 and 8. The starting position for the assembling of the auxiliary clamping member with the bracket 8 is shown in Figure 8 where the downwardly inclined surface 23 is shown engaging the near end 8a of the groove 12 in the bracket 8. Further movement of the auxiliary clamping member 16 to the right, as shown in Figure 8, will cause the detent to deflect in a downward direction until the high point of the detent 22 enters the groove or channel 12. Further movement of the auxiliary clamping member to the right will cause the detent to travel along the groove 12 until the high point of the detent passes the abutment 14 when, due to the inclined surface 24 and to the resilient character of its support, the detent will move upwardly into slot or recess 13. The angle of the inclined surface 24 with relation to the abutment 14 is such that the clamping member will be automatically moved to the right by the strength of the resilient member 21 until stopped by the glass. It will be noted that the auxiliary clamping member will be forced against the base 3 of the frame 2 during the assembling process and also after it is in place. This downward thrust is preferably applied between the front and rear faces of the auxiliary clamping member 16 so that this downward thrust will not tend to tilt the auxiliary clamping member. It is for this reason also that the entire detent is mounted within the projected area of the auxiliary clamping member so that, at no time, will the line of the thrust of the detent be outside of the supporting base of this member. The resiliently supported detent is preferably so tensioned that it will not reach its deflexed position when in contact with the abutment 14, but is so formed as to exert considerable thrust on the auxiliary clamping member in a downward direction as well as in a direction against the glass, when the detent engages the abutment. The inclined surface 24 is made of sufficient length so that any usual variation in the thickness of the glass will not affect the desired thrust downwardly and against the glass just referred to.

It should be noted that the assembling of the auxiliary clamping member 16 on the bracket 8 is accompanied by a snap action which comes into operation as soon as the high point of the detent 22 passes the abutment 14. It will also be evident that this assembling of the auxiliary clamping member on the bracket 8 is accomplished without the use of any tools. This auxiliary clamping member entirely encloses and therefore effectively conceals the bracket 8 to the extent to which it engages the bracket. It will be further evident that the guideway on the bracket 8 is so formed with relation to lips 20 on the auxiliary clamping member 16 that it will be impossible to move this member laterally or even to tilt it, while this member is in engagement with the guideway. It is also evident that the bracket 8 performs four essential functions which are (1) to connect the abutting ends of the frame sections, (2) to aline these abutting ends of the frame sections, (3) to provide a guideway for the auxiliary clamping member and (4) to provide a means for retaining the auxiliary clamping member in position. It will be understood that the removal of the auxiliary clamping member 16 can easily be effected by exerting a pressure against the inner face 19 of this member, in an outward direction. The tension on the detent is so selected that it will ordinarily not be possible to remove this clamping member in any other manner than that specified above without defacing the member.

Figures 4, 5, 7 and 10 illustrate the relation of the parts when the auxiliary clamping member 16 is in place on the frame 2 and before certain main clamping members, intended to permanently support the glass against the lip 5 of the stationary frame 2, have been put in place.

Figure 14:
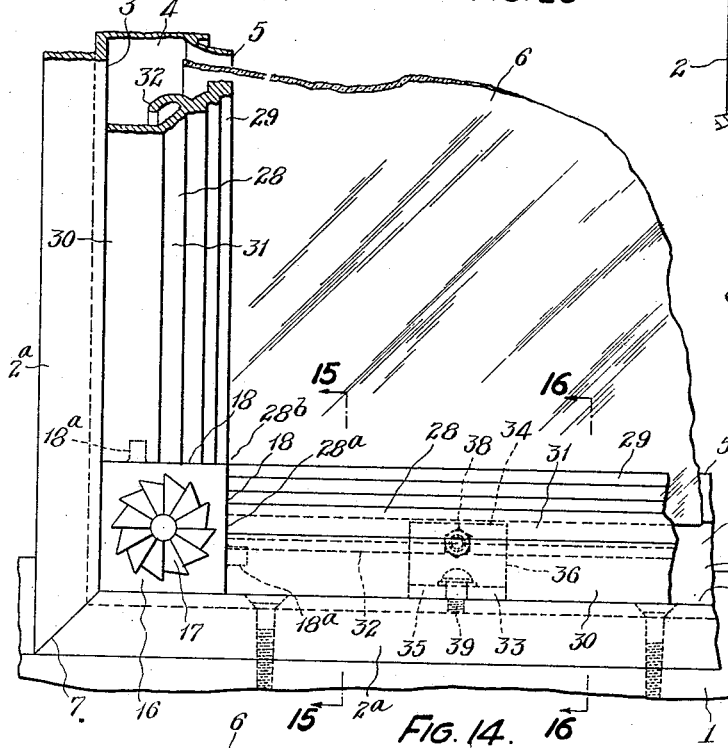
Figure 14 is a view similar to Figure 4 after certain main clamping members have been put in place, this view illustrating the completed structure of this form of the invention.
Figures 15, 16:
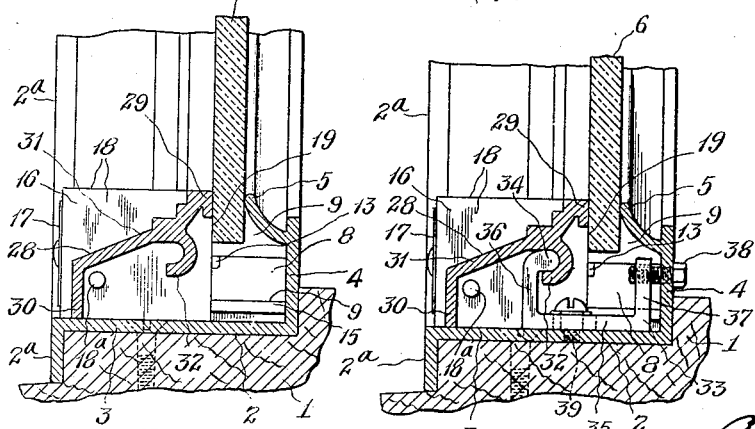
Figure 15 is a vertical sectional view taken from the plane indicated by line 15, 15 in Figure 14, and showing the means for holding the main clamping member against the glass.
Figure 16 is a vertical sectional view taken from the plane indicated by line 16, 16 in Figure 14.

Figures 14, 15 and 16 are views of the above structure after these main clamping members have been put in place. The main clamping members and their relation to the frame 2 will not be described in minute detail as they form the subject matter of my co-pending application Serial No. 316,999, filed November 3rd, 1928, and only so much of this prior structure will be described as is necessary to a complete understanding of the present invention.

Referring now to Figures 14, 15 and 16, each main clamping member 28 is formed at its upper end with a contacting lip 29 which is adapted to contact the glass 6. The lower edge 30 of this main clamping member tightly contacts the base 3 of the stationary frame 2. The intermediate portion 31 of this main clamping member may have any contour which is required to satisfy the artistic appearance desired. Attached to this intermediate portion 31 of the main clamping member is a reversed lip 32, this lip being reversed in the sense that it points in a direction opposite to its clamping movement.

Mounted for sliding movement on the base 3 of the frame 2 is a bracket 33. This bracket is formed at the outer or left end, as shown in Figure 16, with a reversed lip or hooked member 34 adapted to interlock with the reversed lip 32 on the main clamping member 28. This reversed lip 34 is connected to the base portion 35 of the slidable bracket 33 by a substantially vertical flange 36. The inner or rear end of this slidable bracket 33 is, likewise, formed with a substantially vertical flange 37, this flange being provided, preferably near its upper end, with a threaded opening adapted to engage an adjusting or tightening screw 38 which is mounted in an opening in the vertical wall 4 of the frame 2. The base portion 35 of this slidable bracket 33 is further provided with an elongated slot which is intersected by a shoulder screw 39 threaded into the base 3, and provided with a thrust washer.

It will be understood that the shoulder of the screw and the thickness of the washer will be so selected with relation to the thickness of the base portion 35 of the bracket 33 as to provide an easy but accurate sliding fit for this bracket. The brackets 33 are relatively short as compared with the length of the clamping members 28, as shown in Figure 14, and as many of these brackets are used as may be needed to secure the necessary holding power required to maintain the glass securely against dislodgment.

The adjacent ends of the separate main clamping members 28 are spaced apart as clearly shown in Figure 14, leaving an opening 28a, and this open space is preferably substantially of the same size as the cross-section of the auxiliary clamping member so that this clamping member will completely fill the opening. As illustrated in the drawings, the ends of the main clamping members 28 are cut square with the frame, and the side walls of the auxiliary clamping member are formed at right angles with each other. It is understood, however, that my invention is not limited to the particular arrangement shown. It is only necessary that the end of the main clamping member be cut parallel to that face of the auxiliary clamping member with which it contacts. It is well known to those skilled in the art that the fit between the mitres of the two movable clamping members is very difficult to secure and maintain neatly due to the variation in the adjustment and support of the adjacent clamping members. Reference to Figures 15 and 16 will disclose that the side walls 18 of the auxiliary clamping members which contact the ends of the clamping bars 28, project outwardly beyond the members 28 so that any slight difference in alinement of two adjacent main clamping members with the auxiliary clamping member will not be conspicuous. My invention eliminates this troublesome mitered joint between clamping members with a substantial saving in the manufacturing and erection labor required.

The auxiliary clamping member is provided preferably on two of its side walls 18, with a lug or projection 18a as clearly shown in Figures 4, 5, 6, 11, 15 and 16. These lugs are mounted on those walls of the auxiliary clamping member 18 which contact the ends of the main clamping members 28. It will be evident that these lugs will prevent the outward or upward movement of the auxiliary clamping member past the walls of the main clamping member as will be apparent from an inspection of Figures 15 and 16. These lugs 18a are so located with relation to the outer and upper walls of the main clamping member 28 that they will be in close proximity to the inner faces of these walls but spaced therefrom. The purpose of these lugs is to prevent the possible withdrawal of the auxiliary clamping member, from the outside, by unauthorized persons, and to prevent the possible dropping out of this auxiliary clamping member in the event of failure of the detent or its mounting. The space allowed between the inner faces of the walls of the main clamping member and the lug 18a is provided so as to permit the necessary amount of independent movement and adjustment of both the auxiliary and the main clamping members. It will be understood that provision of these lugs 18a on the auxiliary clamping member 16 is only advisable in certain types of installations.

The height of the auxiliary clamping member, as will be seen by reference to Figures 14, 15 and 16, is substantially the same, measuring from the frame upwardly toward the glass, as the corresponding height of the lip 29. In accordance with this construction no substantial portion of the rear face 19 of the auxiliary clamping member projects beyond the main clamping members where the said face and the clamping members contact the glass. This is desirable not only for the purpose of producing a finished design but also to make it impossible for an unauthorized person to apply a thrust to the rear face 19 of the auxiliary clamping member when the main clamping members are in place. When the auxiliary clamping members are not provided with the lugs 18a, this precaution is especially desirable.

It will be apparent that the bracket 8 and the guideway associated therewith, are necessarily alined with the opening 28a between the adjacent ends of the main clamping members. It will also be evident that these auxiliary clamping members serve the purpose of filler blocks or spacer members for closing the openings between the adjacent ends of the main clamping bars and for suitably spacing these clamping bars.

Figure 17:
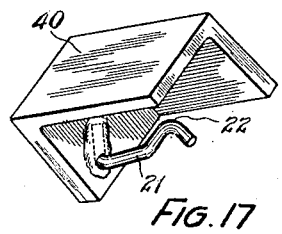
Figure 17 is a view similar to Figure 11 showing a somewhat simplified form of the auxiliary clamping member.
Figure 18:
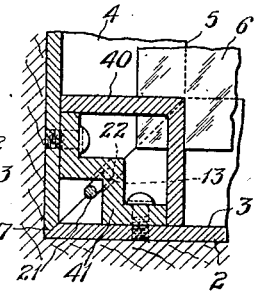
Figure 18 is a view similar to Figure 10, but showing the auxiliary clamping member illustrated in Figure 17, together with a connecting bracket slightly altered to suit this modified form of auxiliary clamping member.

Figures 17 and 18 illustrate a slightly modified form of auxiliary clamping member 40 and a correspondingly modified form of connecting bracket 41. The modification consists of the omission of the lips 20 from the clamping member and the rabbeted edges 15 from the bracket. Figure 18 clearly shows how these two modified forms engage one with the other. These modified parts perform all of the functions performed by the corresponding parts in the views previously described with the excepton that there is no provision made to prevent lateral disengagement when the auxiliary clamping member is assembled on the bracket. This disadvantage is offset by the fact that these modified parts are slightly simpler to manufacture. The member 40 is also characterized by the omission of the lugs 18a.

Figure 20:
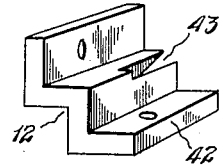
Figure 20 is a view similar to Figure 9, but showing a modified form of this connecting bracket, adapted to co-operate with the clamping member shown in Figure 19.
Figure 21:
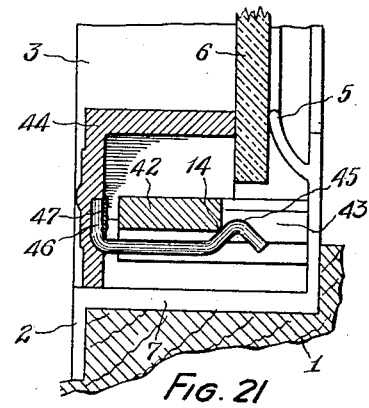
Figure 21 is a view similar to Figure 7, but showing the modified form of auxiliary clamping member and connecting bracket illustrated in Figures 19 and 20.

Figures 19 and 20 illustrate a still further modification of the auxiliary clamping member and connecting bracket. The most important modification consists in a change in the location of the recess in the bracket 42. The recess consists of a slot 43 extending to the inner end of the bracket, this slot being adapted to be formed by a simple milling operation. In order to preserve sufficient strength between the two ears of the bracket 42, it is not desirable to cut this slot more than half way through the length of the bracket. This limitation makes it advisable to provide the auxiliary clamping member 44 with a resiliently mounted detent 45, longer than the corresponding element in the forms referred to above. The interengaged relation of the bracket 42 with the member 44 is clearly shown in Figure 21. It will also be noted that a modified form of connection between the resiliently mounted detent 45 and the member 44 is shown in Figures 19 and 21. This connection consists of a suitable recess formed in the member 44 to fit the tail 46 of the detent 45, and solder 47 applied to properly hold said tail in said recess, and is only shown to illustrate another method of making this connection. Any other connecting means might be used for this purpose which will not remove the spring temper from the resilient detent 45.

Figure 22:
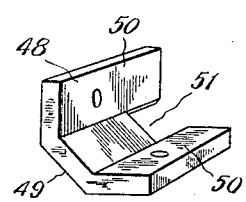
Figure 22 is a view similar to Figure 20, but showing a further modification which may be made in this bracket.

Figure 22 illustrates a further modification of the connecting bracket 48 similar to the bracket 42 shown in Figure 20, and somewhat simpler in cross-section. This bracket is not provided with the groove or channel 12 but instead is provided with the flat surface 49 connecting the ears 50. This bracket is provided with a slot 51 similar to that of the bracket 42 but considerably wider. This bracket is especially useful in case the auxiliary clamping member, of the type previously described, intended to co-operate with this bracket, is provided with a flat detent instead of the round. Such a detent is illustrated in connection with a different form of auxiliary clamping member hereinafter to be described.

This invention, as described so far, is shown applied to a corner construction and specifically to a construction where a horizontal and a vertical portion of a window mounting meet to form a right angle corner. My invention is also applicable to other portions of the window mounting, for instance, in a straight section of the window mounting where a horizontal section is met by a vertical section of the glass support or even, in some cases, in straight sections of the window mounting where there may be no vertical section.

Figures 23 to 28 inclusive illustrate one form of this improved auxiliary clamping member which is placed in a window mounting at the junction of a horizontal and a vertical window supporting member. In these figures 2 indicates the supporting frame which consists of two frame elements 2a abutting at 53. This frame is provided with a base 3 substantially perpendicular to the plane of the glass and a vertical wall 4 formed with a lip 5 adapted to contact the glass. This frame is suitably mounted on a sill or wall 1. The two elements of the supporting frame are accurately alined and rigidly secured together by a bracket 54. This bracket is formed with ears 55 which are perforated for screws 56 engaging threaded openings in the base 3 of the frame 2. The ears 55 in this form of bracket are parallel and in the same plane. This bracket 54 is further provided with a groove or channel 57 and a slot or recess 58 provided with a shoulder or abutment 59, as clearly shown in Figures 25, 26 and 28. These ears are further provided with beveled edges as shown at 60, forming guideways in a direction at right angles with the plane of the glass 6.

Adapted to interengage with the bracket 54 is an auxiliary clamping member 61 provided with a substantially closed front face 62, side walls 63 and a partly open rear or inner face 64. The side walls 63 are provided with beveled lips 65 conforming to the beveled edges 60 of the bracket 54 and adapted for sliding engagement therewith. This auxiliary clamping member is further provided with a resiliently mounted detent 66 formed, at its extreme end, with a downwardly and inwardly inclined surface 67 and adjacent thereto with a downwardly and outwardly inclined surface 68. This resiliently mounted detent is preferably secured to the front face 62 of the auxiliary clamping member in any desirable manner as, for instance, by solder as shown at 69. This detent 66, in this form of the invention, is made from substantially flat material instead of round material used for detents previously described. The details of this auxiliary clamping member are clearly shown in Figures 25 to 27 inclusive.

It will be understood that the method of assembling of this auxiliary clamping member 61 with the bracket 54 is substantially the same as the method of assembling the auxiliary clamping member 16 with the bracket 8, after the glass has been temporarily supported. This method of assembling simply consists of resting the member 61 on the frame 2, causing the beveled lips 65 of the auxiliary clamping member to engage the guideway formed by the beveled edges 60 of bracket and forcing the auxiliary clamping member toward the glass, whereupon, as soon as the bracket has reached a certain predetermined position, it will automatically snap in place and yieldingly contact the glass due to the wedge action of the inclined surface 68.

It will also be evident that this form of auxiliary clamping member is forced downwardly against the frame, and that the guideways 60 and the co-operating lips 65 are so formed as to prevent the lateral or upward disengagement of the auxiliary clamping member from the connecting bracket.

Associated with this auxiliary clamping member 61 are the main clamping members 28, the construction of which and the method of mounting of which have been previously described. It will be apparent, as in the construction previously described, that the main clamping members 28 are cut parallel to the side walls of the member 61 and that these walls 63 substantially contact the ends of the main clamping members 28. It will be apparent in Figure 24 that this clamping member 61 extends outwardly beyond the outer wall of the main clamping member 28 and that a misalinement, due to different requirements of adjustment of the main clamping members will not produce an unsightly joint as would be the case if the two clamping members abutted directly one against the other.

Immediately above the auxiliary clamping member and preferably centrally located therewith is a vertical glass supporting member 70 substantially of T-shaped cross-section as shown in Figure 24. The outer face of this glass supporting member is preferably of ornamental design to harmonize with the design of the balance of the window mounting and this member is independently supported from the frame or wall of the building. This member may be installed before or after the auxiliary clamping member 61 is assembled on the frame 2 as it has no connection therewith, but the glass supporting member 70 is preferably so formed as to be in substantial contact with the top surface of the auxiliary clamping member 61. Glass holding members 71 of any desirable type may be associated with the member 70 for holding the glass in position.

Figures 29 and 30 illustrate an auxiliary clamping member 72 substantially identical with the clamping member shown and described with reference to Figures 23 to 28 with the exception that the side walls 73 are provided with lugs 73a similar to the lugs 18a on the brackets 16. These lugs are provided to prevent the unauthorized, accidental or forcible removal of the auxiliary clamping member 72 as fully explained in connection with the lugs on the auxiliary clamping members 16. I further prefer to omit the lips 65 and the guideway 60 from the auxiliary clamping member and bracket respectively when I provide the lugs 73a, as is clearly shown in Figure 29.

It should be pointed out that these auxiliary clamping members or filler blocks 16, 40, 44 and 61 are not intended in any sense as the main clamping members because it would not be practical to support a glass only at the corners or other widely spaced points at the edges thereof, as this would be likely to cause fracture of the glass. In fact, the blocks are mounted resiliently so that they will not cause any undue strain to be brought upon the glass and so that they will yield if, for any reason, the glass exerts a stress against them.

It will be apparent that the use of these auxiliary clamping members or filler blocks expedite erection. These blocks are very quickly and very easily snapped into place without the use of any tools, screws or other extraneous means. This method of assembling is especially advantageous when placing these blocks in the upper corners of a window mounting. The fact that the blocks preferably have walls which are square with the main frame makes it possible to cut the ends of the main clamping members square, which is the simplest possible cut and the easiest to fit, as is well understood by those skilled in this art.

The illustrations show the auxiliary clamping member as a relatively short block in association with comparatively long main clamping members. In its broader aspects, however, this invention is not limited to such a relatively short block as a longer member of this type might be used. A plurality of guideways and recesses might be provided upon the frame and a corresponding number of detents might be mounted on the clamping member without departing from the spirit of this invention. In its broader aspect also, this invention is not limited to an auxiliary clamping member which actually contacts the glass as this invention might advantageously be used in a similar arrangement of parts in which this member does not actually contact the glass.

It should further be pointed out that the resiliently mounted detent need not necessarily be associated with the movable auxiliary clamping member as this invention would work equally well if the resiliently mounted detent were associated with the connecting bracket and a suitable recess provided in the auxiliary clamping member.

It will also be evident that the guideway and recess for locating the auxiliary clamping member need not necessarily be formed on a separate bracket, but might be integrally formed in the body of the frame 2.

While this invention is shown applied to the mounting of glass in a store front window, it will be apparent that this invention may be used for supporting glass in partitions, display cases and other similar structures. This invention is also applicable to the mounting of glass in movable structures such as doors, sash and transoms, and I contemplate such uses for this invention. I also purpose to use this invention for supporting blank non-transparent panels in doors, partitions and other places where such mountings may be used, and for this reason it is not intended that this invention be limited to the mounting of glass.

What I claim is:

1. An ornamental member forming a part of a window mounting or the like, comprising a substantially blank end wall, a plurality of parallel side walls and a resiliently mounted element.

2. As a new article of manufacture a detachable member for a window frame or the like having one end substantially closed by a blank wall, the opposite end substantially open, a plurality of parallel side walls and provided with a resiliently mounted detent.

3. As a new article of manufacture a detachable block for a window frame or the like, comprising an outer face, a plurality of side faces, an open inner face and a resiliently mounted detent, said detent being entirely enclosed within the planes of the faces of said block.

4. In a mounting for glass or the like, a member stationary relatively to the glass and a member movable relatively to the glass, said movable member being adapted to be assembled with the stationary member by snap action, and adapted to be dissembled from the stationary member by a thrust acting perpendicular to and from the plane of the glass.

5. In a mounting for glass or the like, a member stationary with relation to said glass and a member comprising a rigid portion and a resilient element and movable with relation to said glass, said movable member being adapted to be automatically yieldingly held against said glass when moved into position in contact with the glass.

6. In a mounting for glass or the like, a member stationary relatively to the glass and a member movable perpendicularly to the plane of the glass, one of said members being provided with a resiliently mounted detent, adapted for holding said members in yielding engagement with each other, said detent controlling the intensity of said yielding engagement.

7. In a mounting for glass or the like, an inner rigid member stationary relatively to the glass and an outer rigid member movable relatively to the glass one of said members being provided with a resiliently mounted detent adapted to hold the said members in engagement with each other and to hold one of said members in yielding engagement with the glass.

8. In a mounting for glass or the like, a frame comprising a plurality of frame members, a bracket adapted accurately to aline two adjacent frame members, said bracket being provided with a recess, in combination with a movable member adapted for sliding engagement with said bracket and provided with a resiliently mounted detent adapted for engagement with said recess.

9. In a mounting for glass or the like, a supporting frame, a guideway provided on said frame, a movable member engaging said guideway, and means adapted to hold said movable member in yielding engagement with said guideway.

10. In a mounting for glass or the like, a supporting frame, a guideway provided on said frame, a movable member engaging said guideway, and means adapted to hold said movable member in yielding engagement with said guideway and in yielding contact with said glass.

11. In a mounting for glass or the like, a supporting frame, a recess provided on said frame, in combination with a member provided with a resiliently mounted detent, said detent adapted to engage said recess when said member is moved toward said glass and adapted to disengage said recess when said member is moved from said glass.

12. In a mounting for glass or the like, a supporting frame, a recess provided on said frame, in combination with a rigid member provided with a resiliently mounted detent, said detent being adapted to engage said recess and being adapted to force said rigid member into yielding contact with various thicknesses of glass.

13. In a mounting for glass or the like, a supporting frame, a bracket mounted on said frame, a movable member adapted to encompass said bracket and adapted to yieldingly contact said glass.

14. In a mounting for glass or the like, a supporting frame, a bracket mounted on said frame, said bracket being provided with parallel guiding edges at right angles with the plane of the glass, a slidable member adapted for sliding engagement with said edges and with said frame and yielding means for forcing said slidable member toward said glass.

15. In a mounting for glass or the like, a supporting frame, a bracket mounted on said frame, said bracket being provided with parallel guiding edges at right angles with the plane of the glass, a slidable member adapted for sliding engagement with said edges and with said frame and yielding means adapted to force said slidable member toward said frame and toward said edges during the assembling of said slidable member on said bracket and after the completion of such assembling.

16. In a mounting for glass or the like, a supporting frame, said frame being provided with a groove, in combination with a rigid member movable in a direction substantially perpendicular to the plane of the glass and provided with a resiliently mounted detent, said groove adapted to guide said member.

17. In a mounting for glass or the like, a supporting frame, said frame being provided with an abutment, in combination with a member movable in a direction substantially perpendicular to the plane of the glass and comprising a resilient detent provided with an inclined face, said inclined face being adapted to engage said abutment, whereby the movable member is yieldingly forced toward said glass.

18. In a mounting for glass or the like, a supporting frame, said frame being provided with a recess, in combination with a movable rigid member provided with a resilient element formed with a projection, said projection being adapted to engage said recess whereby said rigid member is resiliently interlocked with said frame.

19. In a mounting for glass or the like, a frame member, a plurality of clamping members adapted to hold the glass in position against said frame, the ends of said clamping members being spaced apart, a spacer member adapted to be interposed between the ends of said clamping members and adapted to be automatically held in position when manually pushed in place.

20. In a mounting for glass or the like, a frame member, a plurality of clamping members adapted to hold the glass in position against said frame, an opening being provided between the ends of said clamping members, a filler member adapted to substantially fill said opening and resilient means for holding said filler member in place.

21. In a mounting for glass or the like, a frame member, a plurality of relatively long clamping bars provided with means for holding the glass in position against said frame, an opening being provided between adjacent ends of said clamping bars, an auxiliary clamping member mounted in said opening and resilient means for holding said auxiliary clamping member against said glass.

22. In a mounting for glass or the like, a frame, stationary relative to the glass, a plurality of clamping members adapted for clamping said glass against said frame, an opening provided between the adjacent ends of said clamping members, a slidable member inserted in said opening and means for guiding said slidable member and resilient means for holding said slidable member in position.

23. In a mounting for glass or the like, a glass supporting frame, a plurality of clamping members adapted to hold said glass in position against said frame, an opening provided between the adjacent ends of said clamping members, said frame being provided with a bracket alined with said opening, a movable member inserted in said opening and resilient means adapted to interlock said movable member with said bracket.

24. In a mounting for glass or the like, a frame stationary relative to the glass, said frame being provided with a guideway, a movable member adapted for slidable engagement with said guideway, said guideway including means adapted to prevent the lateral disengagement of the movable member from the guideway and resilient means adapted for forcing said movable member toward said glass.

25. In a mounting for glass or the like, a glass supporting frame, said frame being provided with a guideway, substantially at right angles with the plane of the glass, a clamping member adapted for slidable engagement with said guideway and laterally interlocked therewith.

26. In a mounting for glass or the like, a supporting frame provided with a lip for contacting the glass and provided with an abutment facing said lip, a relatively rigid detachable member provided with a resilient catch, said catch adapted to engage said abutment, whereby the said detachable member is held in position on said frame.

27. In a mounting for glass or the like, a supporting frame provided with an abutment, in combination with a relatively rigid detachable member provided with a supporting base and having a resiliently mounted projection adapted for engagement with said abutment, said engagement of the projection with said abutment being within the projected area of said supporting base.

28. In a mounting for glass or the like, a supporting frame, a plurality of glass clamping members, a guideway provided on said frame, a movable member engaging said guideway and means associated with said glass clamping members, adapted to prevent the removal of said member from said guideway.

29. In a mounting for glass or the like, a supporting frame, a main glass clamping member, a recess provided on said frame, in combination with a removable member provided with a resiliently mounted detent, said detent adapted to engage said recess and means associated with said main clamping member, adapted to prevent the removal of said detent from said recess.

30. In a mounting for glass or the like, a supporting frame, a pair of main glass clamping members, a spacer member mounted between said pair of main glass clamping members, said spacer member slidingly mounted on said frame, means adapted to prevent the removal of said spacer member when said clamping members are in place, and means adapted to adjust said main glass clamping members in relation to the frame and with relation to said spacer member.

31. In a mounting for glass or the like, a frame member, a plurality of clamping members adapted to hold the glass in position against said frame, an opening provided between the ends of said clamping members, a filler member adapted to substantially fill said opening, resilient means adapted to hold said filler member in place, and means adapted to prevent the removal of said filler member when said clamping members are in place.

32. In a mounting for glass or the like, a frame member, a plurality of clamping members adapted to hold the glass in position against said frame, an opening provided between the ends of said clamping members, a filler member adapted to substantially fill said opening, resilient means for holding said filler member in place, and positive means adapted to prevent the removal of said filler member from said opening.

Signed by me this 25th day of April, 1929.

ALBERT H. MARTY.